United States Patent [19]

Simelunas et al.

[11] Patent Number: 4,679,496
[45] Date of Patent: Jul. 14, 1987

[54] APPARATUS FOR PRODUCING LAMINATED PRODUCTS

[75] Inventors: William J. Simelunas, Glen Rock; Nicholas R. Polifroni, Cliffside Park, both of N.J.

[73] Assignee: Nabisco Brands, Inc., Parsippany, N.J.

[21] Appl. No.: 611,671

[22] Filed: May 18, 1984

[51] Int. Cl.$^4$ .............................................. A23G 3/00
[52] U.S. Cl. .................................. 99/450.2; 99/450.1
[58] Field of Search ......................... 99/450.1–450.8, 99/353; 425/320, 321, 322, 335, 363, 371, 374; 426/274, 297, 502, 524

[56] References Cited

U.S. PATENT DOCUMENTS

| | | | |
|---|---|---|---|
| 2,577,925 | 12/1951 | Sternbach | 99/450.2 |
| 3,512,990 | 5/1970 | Slaybaugh | 426/502 X |
| 3,551,161 | 12/1970 | Whitestone | 426/297 |
| 3,605,641 | 9/1971 | Shuster | 99/450.7 |
| 4,047,478 | 9/1977 | Trostmann et al. | 99/450.1 |
| 4,084,493 | 4/1978 | Quintana | 99/450.7 |
| 4,393,758 | 7/1983 | Anmahian | 99/450.6 |
| 4,457,225 | 7/1984 | Bakker | 99/450.6 |

*Primary Examiner*—Timothy F. Simone
*Attorney, Agent, or Firm*—Richard Kornutik

[57] ABSTRACT

A method and apparatus for producing laminated products, such as candy, is disclosed. The method includes the steps of continuously forming a semifluid sheet of a first material on a longitudinally extending conveyor, depositing a semifluid second material on the sheet of the first material, continuously rolling the sheet from the edges thereof inwardly to form a double roll extending longitudinally along the conveyor, and flattening the roll into a laminated sheet product. The method further includes the steps of forming the sheet into a "rope" of substantially smaller width than the sheet by folding the sheet over itself from the edges of the sheet and allowing the rope to move transversely across a slower moving conveyor so that the rope bunches up on the conveyor. The rope is then flattened by a roller. The method also includes the step of causing the sheet to longitudinally fold over itself so as to form laminations. Addtionally, the method includes the steps of dividing the laminated sheet product into longitudinally extending strips and transversely dividing the strips into individual product pieces. Apparatus for achieving the method is also disclosed.

20 Claims, 33 Drawing Figures

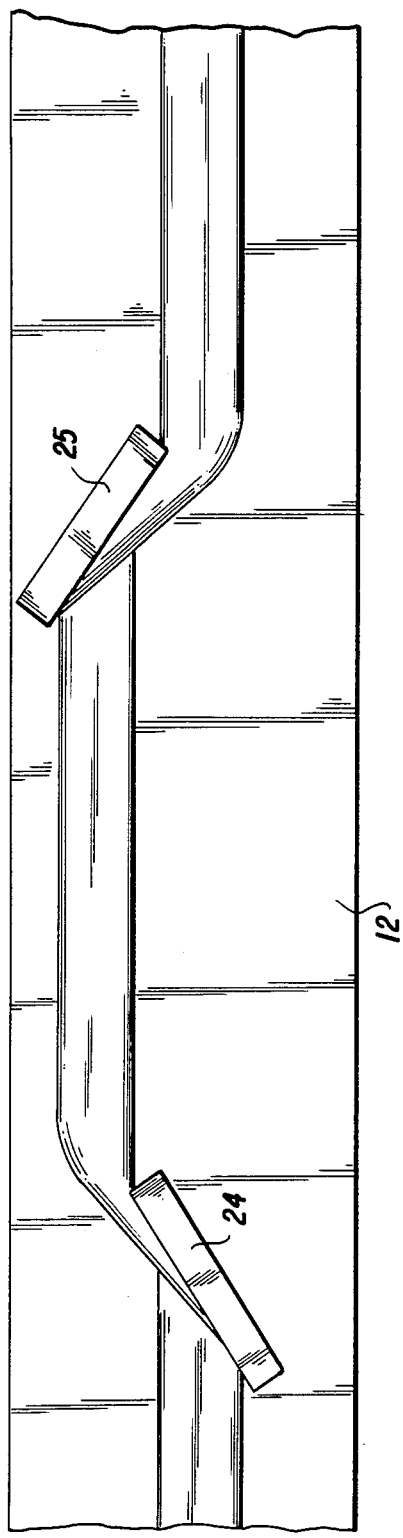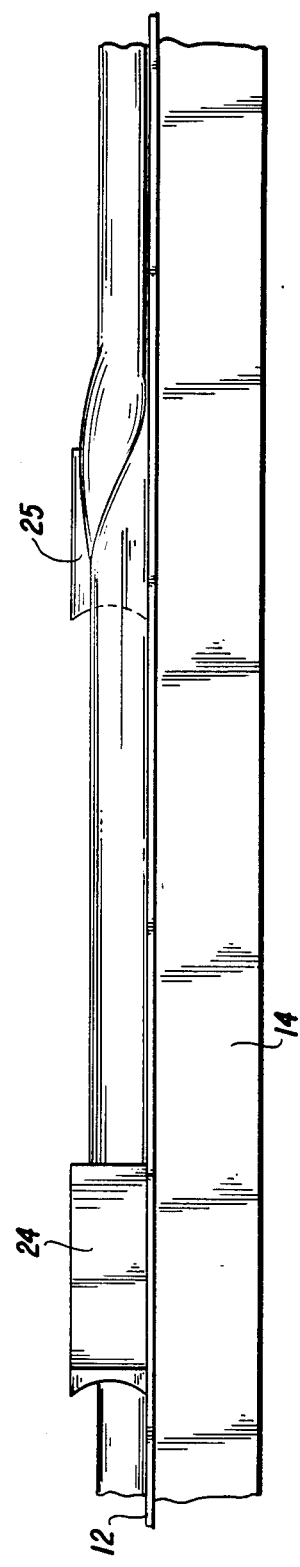

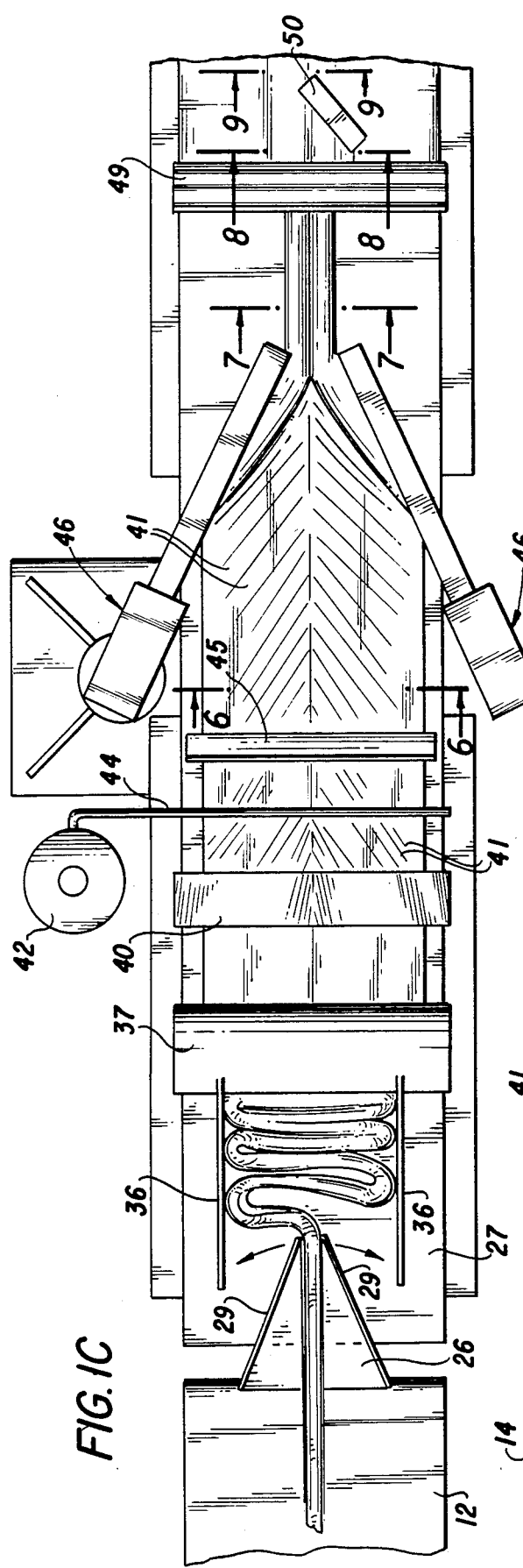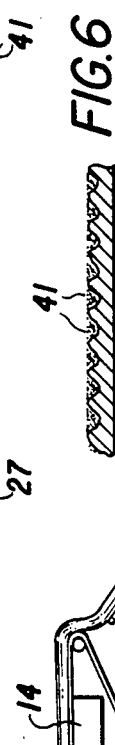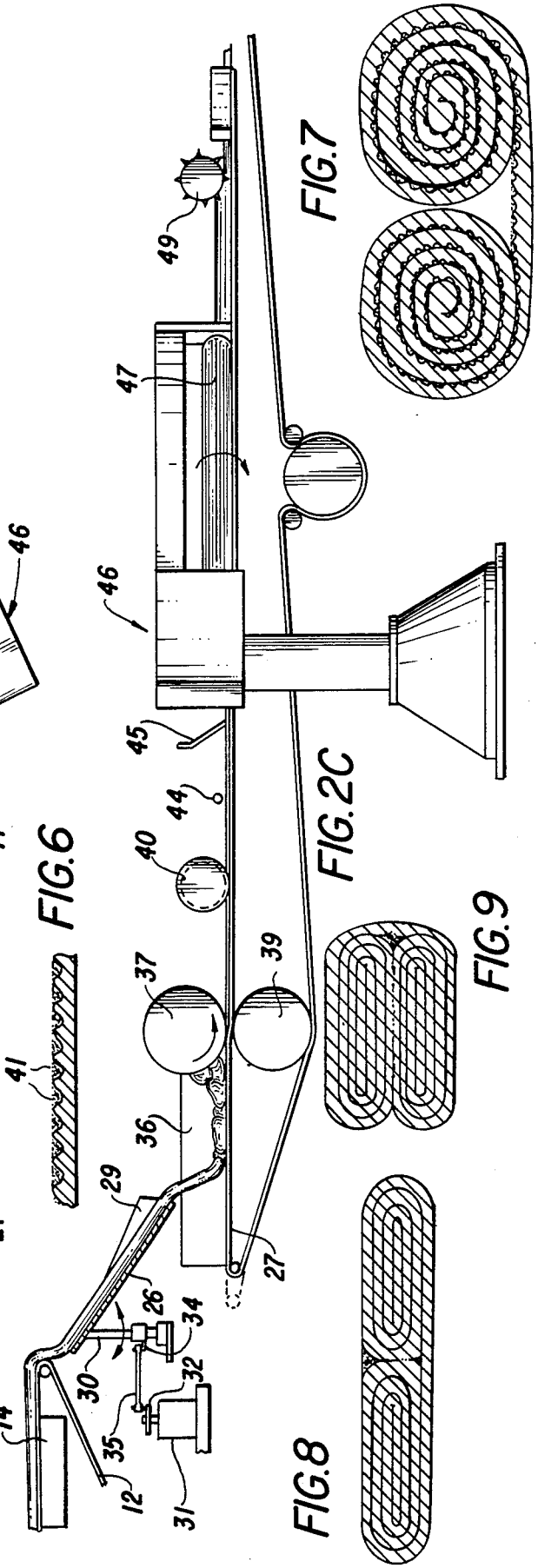

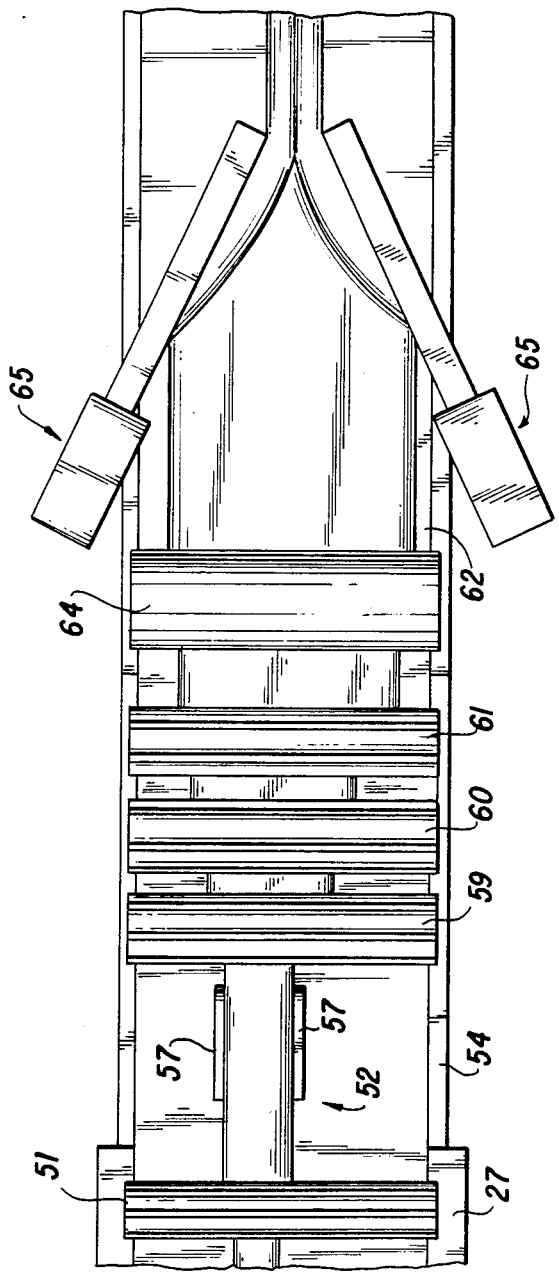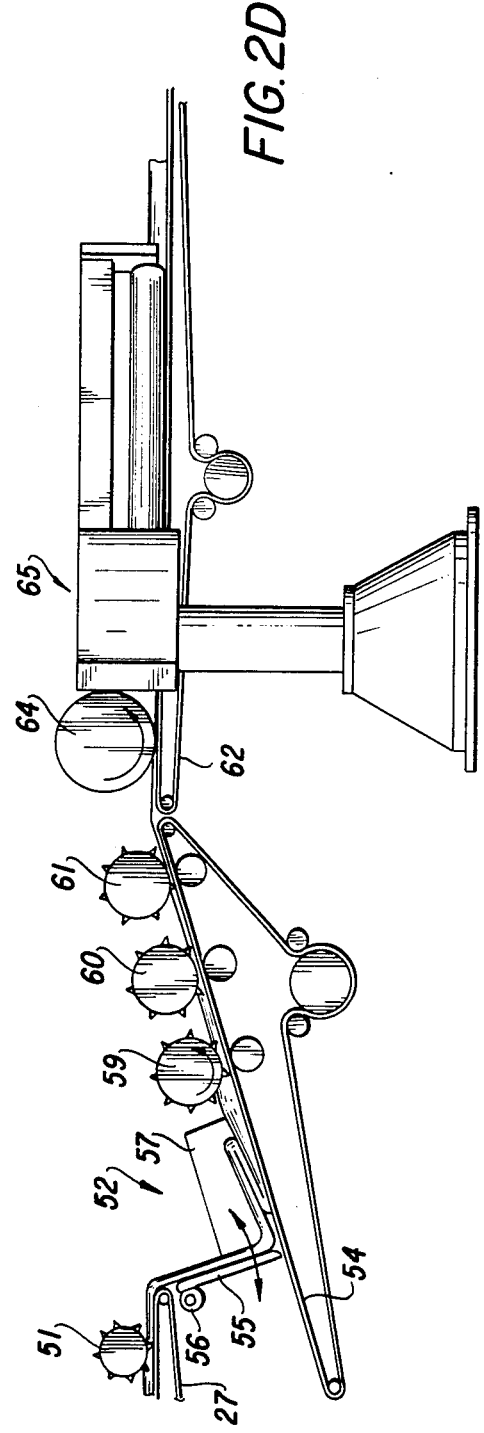

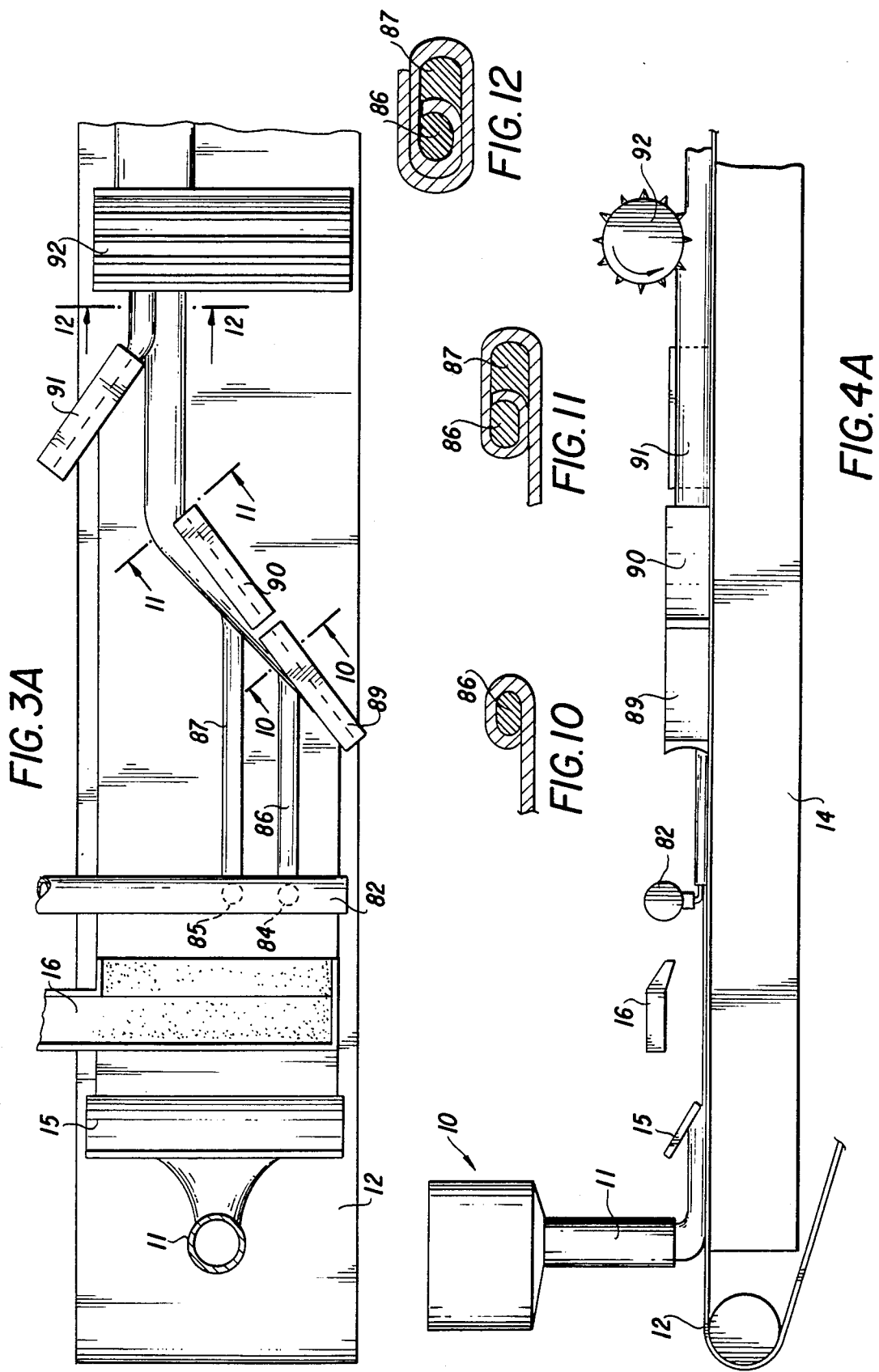

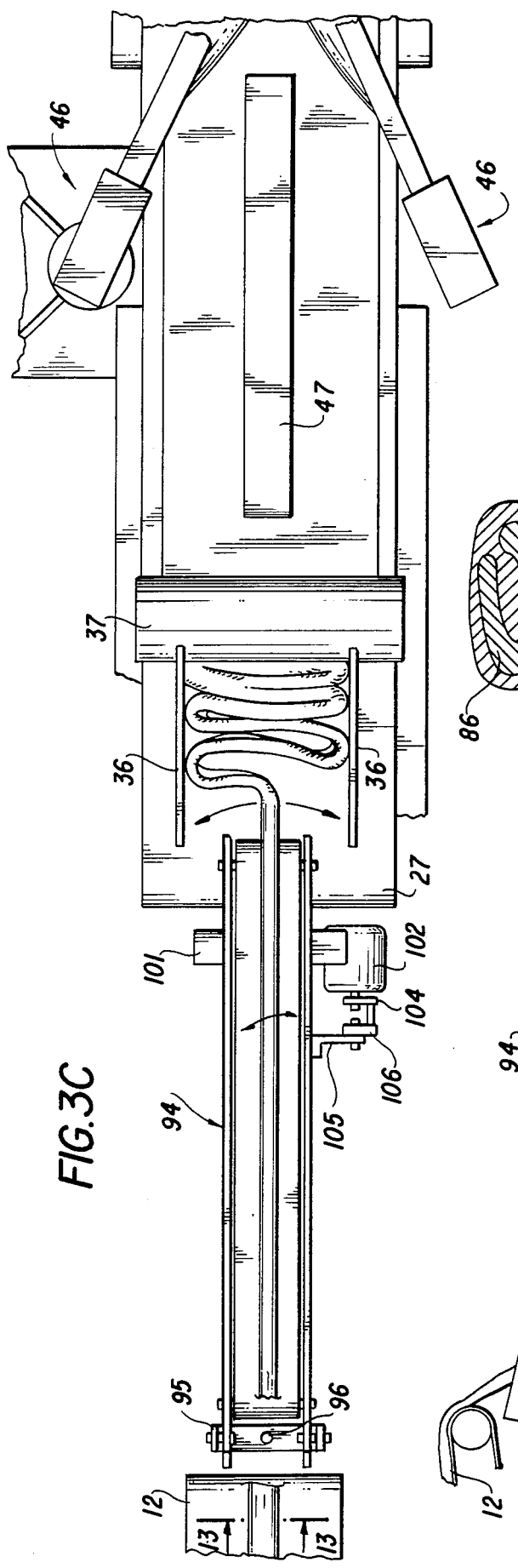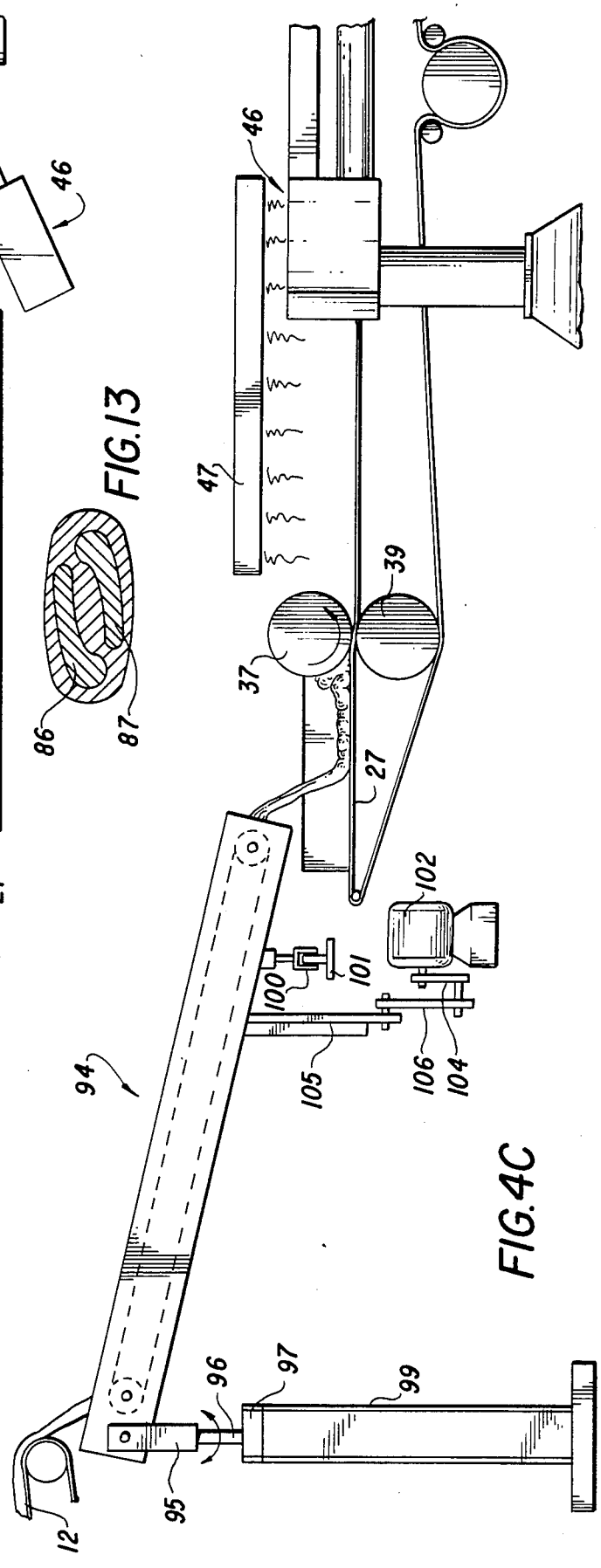

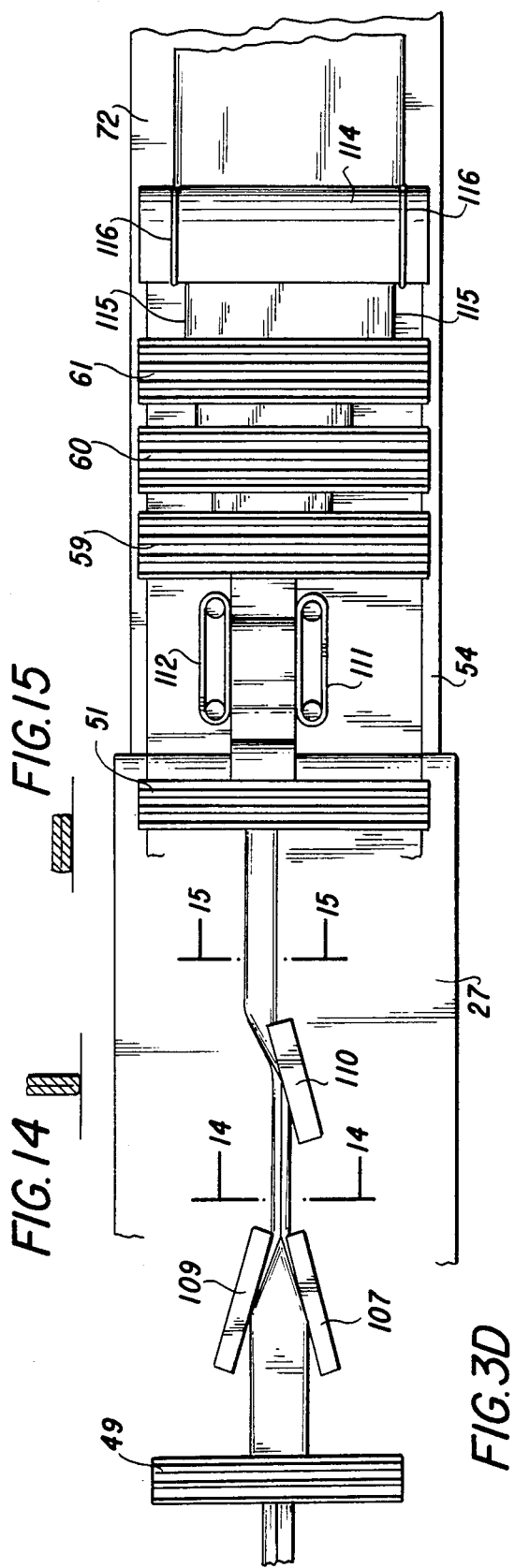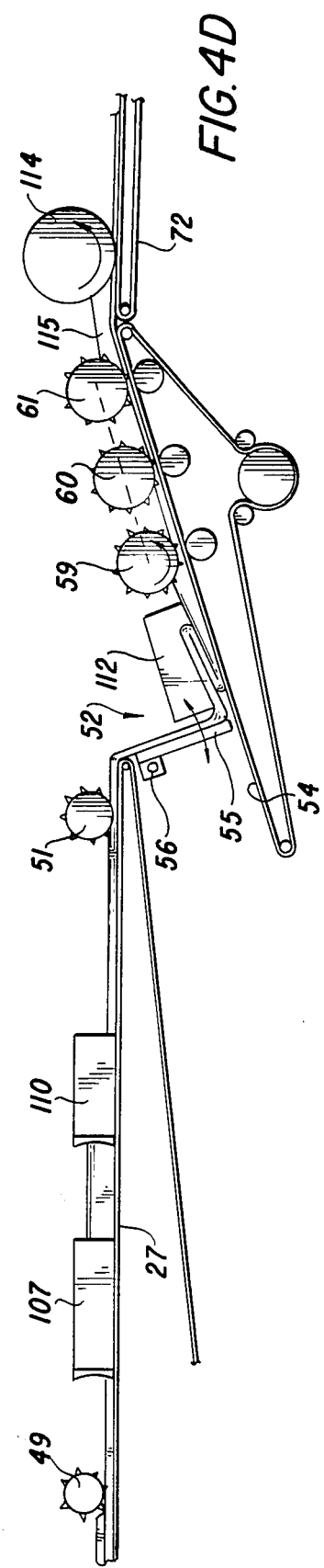

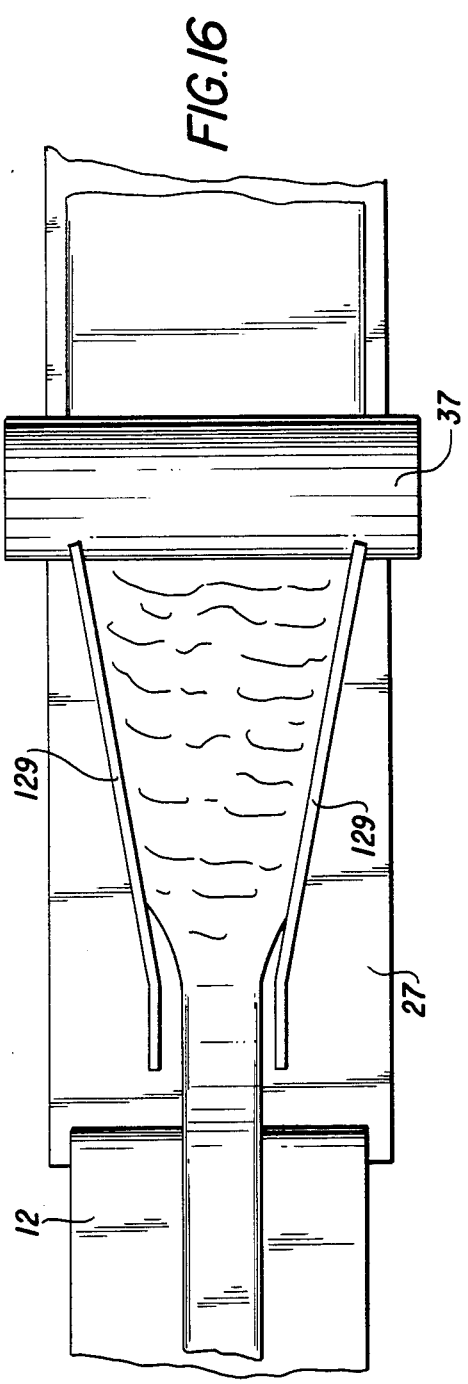
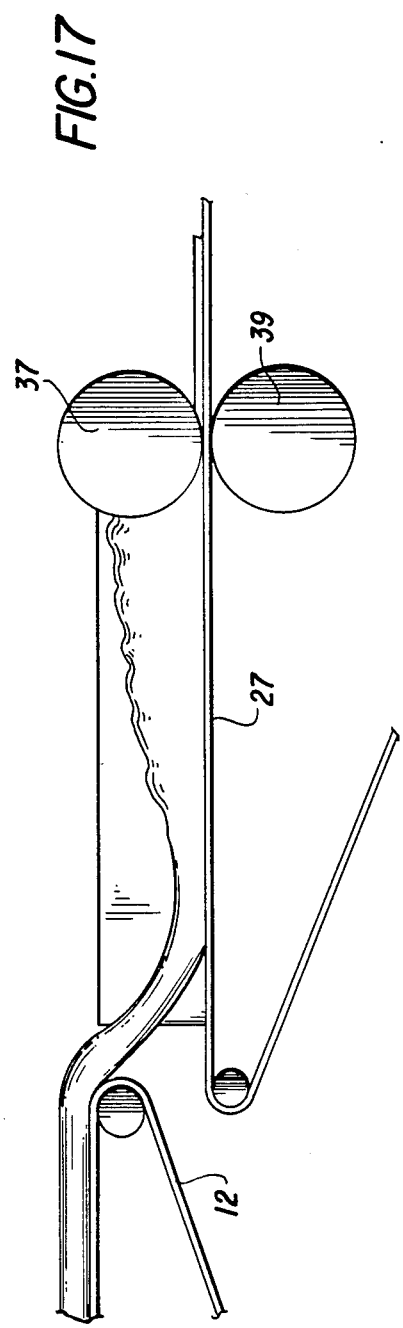

APPARATUS FOR PRODUCING LAMINATED PRODUCTS

BACKGROUND OF THE INVENTION

The present invention relates to the manufacture of laminated products having many layers, and, more particularly, to the manufacture of laminated food products, such as candy, which are formed by the layering of a smooth nonabsorbent material and a soft flowable material.

For many years, candy bars have been manufactured which have a crisp texture together with a strong flavor component associated with a soft material. This combination of texture and taste has been achieved by producing a laminate which contains many thin layers of a brittle candy separated by thin layers of the soft flavor material.

These candy bars are conventionally made by a labor intensive process that produces inconsistent results. In the prior art process, a hot solution of corn syrup and sugar is dropped on a circular chilled table. A pair of scrapers work the solution by drawing it from opposite outer edges of the table toward the center, the table turning about ⅛ turn between successive scraper operations. As the solution cools, it turns into a soft pliable taffy. Color and flavor ingredients, in liquid form, may be added to the taffy by pouring it into a depression formed in the taffy mass. The taffy mass is manually folded to cover and close the depression. The mass is then manually lifted onto the hooks of a taffy puller. The puller works the taffy, aerating it to reduce its density.

The aerated taffy is transferred from the puller to a conveyor and is fed between rollers to a form sheet. A layer, for example, of hot peanut butter is applied to the sheet and the sheet is severed at predetermined intervals. Each section of sheet is rolled into a log weighing about 80 lbs. The log is folded in half, fed between rollers and rolled out into a sheet once more. This sheet is again rolled into a log which is manually wrapped in a sheet of taffy to keep peanut butter from squeezing out the ends and to provide and insure that the product pieces have an outer sheet of candy with no exposed peanut butter.

The log is manually placed in one of a number of spinning machines that feed a conveyor. The spinning machines have several long rotating cones provided with traction knobs and are positioned on axes that converge toward the output end. The cones are spaced to receive the log and are rotated to draw the log toward the output end and thus stretch the log into a rope about 1/5 its original diameter (from about 5 inches diameter to about 1 inch diameter). The ends of the rope are manually fed onto a conveyor which carries a number of ropes each formed by a separate spinner. The ropes are divided into product sized bars and enrobed with chocolate.

The sheet of taffy in which the log is wrapped forms a taffy wall at each end of the log. As these end portions are stretched out to form the rope, they produce rope sections containing unlaminated taffy. This results in undesirable hard spots in the candy bars.

SUMMARY OF THE INVENTION

An object of the present invention is to provide a method and apparatus for continuously producing uniform products that are composed of alternate layers of different materials.

It is a further object to provide a method and apparatus which has particular application in the manufacture of laminated candy products made of alternating layers of hard and soft materials.

It is still a further object to provide a method and apparatus which eliminates the disadvantages of known methods of making laminated candy products.

These and other objects of the present invention are achieved by a method for producing a laminated sheet product comprising the steps of continuously forming a semifluid sheet of a first material on a moving conveyor, continuously depositing a second material onto the sheet of first material to form a layered sheet of the first and second materials, continuously rolling the layered sheet from the edges thereof inwardly to form a double roll extending longitudinally along the conveyor and flattening the roll to form a laminated sheet. In order to produce individual commercial product sized pieces, the laminated sheet is then divided into longitudinally extending strips and the strips are then cut transversely into individual pieces.

In accordance with the above described method, the objects of the invention are achieved by an apparatus for producing a laminated sheet product having alternating thin layers of a semifluid first material and a semifluid second material comprising longitudinally extending conveyor means, means for continuously forming a semifluid sheet of the first material on the conveyor means, means for continuously depositing the second material on the sheet to form a layered sheet of first and second materials, means for continuously rolling the sheet from the edges thereof inwardly to form a double roll extending longitudinally along the conveyor means and means for flattening the roll into a laminated sheet product.

Other objects, features and advantages of the present invention will be apparent from a reading of the detailed description which follows.

BRIEF DESCRIPTION OF THE DRAWINGS

Preferred embodiments of the invention have been chosen for purposes of illustration and description, and are shown in the accompanying drawings forming a part of the specification, wherein:

FIGS. 1A to 1E provide a top plan view of apparatus according to the present invention when laid out end to end in sequential order;

FIGS. 2A to 2E provide a front elevational view of the apparatus shown in FIGS. 1A to 1E when laid out end to end in sequential order;

FIGS. 3A to 3E provide a top plan view of a second embodiment of apparatus according to the present invention when laid out end to end;

FIGS. 4A to 4E provide a front elevational view of the apparatus shown in FIGS. 3A to 3E when laid out end to end;

FIG. 6 is a sectional view of the product taken along line 6—6 of FIG. 1C;

FIG. 7 is a sectional view of the product taken along line 7—7 of FIG. 1C;

FIG. 8 is a sectional view of the product taken along line 8—8 of FIG. 1C;

FIG. 9 is a sectional view of the product taken along line 9—9 of FIG. 1C;

FIG. 10 is a sectional view of the product taken along line 10—10 of FIG. 3A;

FIG. 11 is a sectional view of the product taken along line 11—11 of FIG. 3A;

FIG. 12 is a sectional view of the product taken along line 12—12 of FIG. 3A;

FIG. 13 is a sectional view of the product taken along line 13—13 of FIG. 3C;

FIG. 14 is a sectional view of the product taken along line 14—14 of FIG. 3D;

FIG. 15 is a sectional view of the product taken along line 15—15 of FIG. 3D;

FIG. 16 is a top plan view of a modification usable in place of a laterally oscillating chute or conveyor; and FIG. 17 is a front elevational view of the apparatus of FIG. 16.

DESCRIPTION OF THE PREFERRED EMBODIMENTS

Figure 1A:
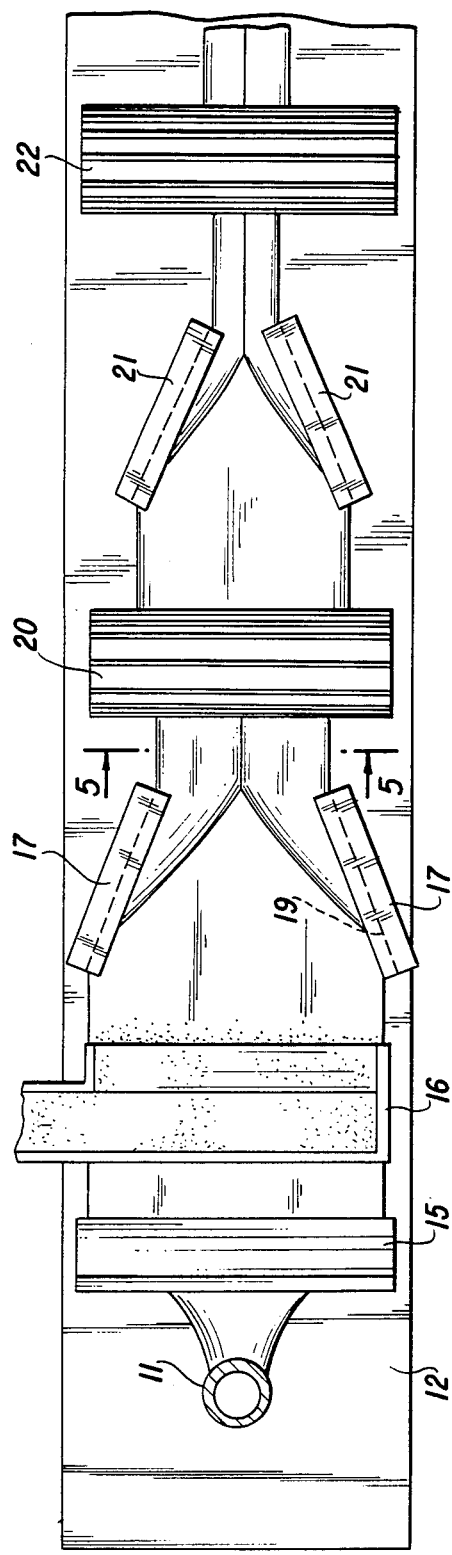

Referring now to the drawings, there is shown in FIGS. 1A–1E and 2A–2E one embodiment of apparatus according to the present invention in which a cooking and aerating unit 10 continuously produces a stream of a hot aerated solution of corn syrup and sugar, discharging the stream through a nozzle 11 onto a steel band conveyor 12. The unit 10 may be one of the type manufactured by the Otto Hansel company of Germany and sold under the trade name SUCROLINER.

The solution exiting from the nozzle 11 is at about 258° F. and is in a very liquid state. A water cooling unit 14 is provided below the upper run of the conveyor 12 to cool the solution to a working temperature between 160° F. and 200° F., at which temperature the solution is in a plastic state. The cooling unit 14 sprays water on the bottom surface of the upper run of the conveyor band. The temperature of the spray water varies from about 160° F. near the input end of the conveyor 12 where the solution is hottest to about 120° F. near its output end.

The stream of solution discharged from the nozzle 11 is immediately spread across the conveyor 12 by a spreader 15 to form a sheet of candy. Ground candy scrap, commonly referred to as "rework", is sprinkled onto the sheet from a vibratory feeder 16 and melts into the hot sheet.

Figure 5:
FIG. 5 is a sectional view of the product on the conveyor taken along line 5—5 of FIG. 1A.
Figure 2A:
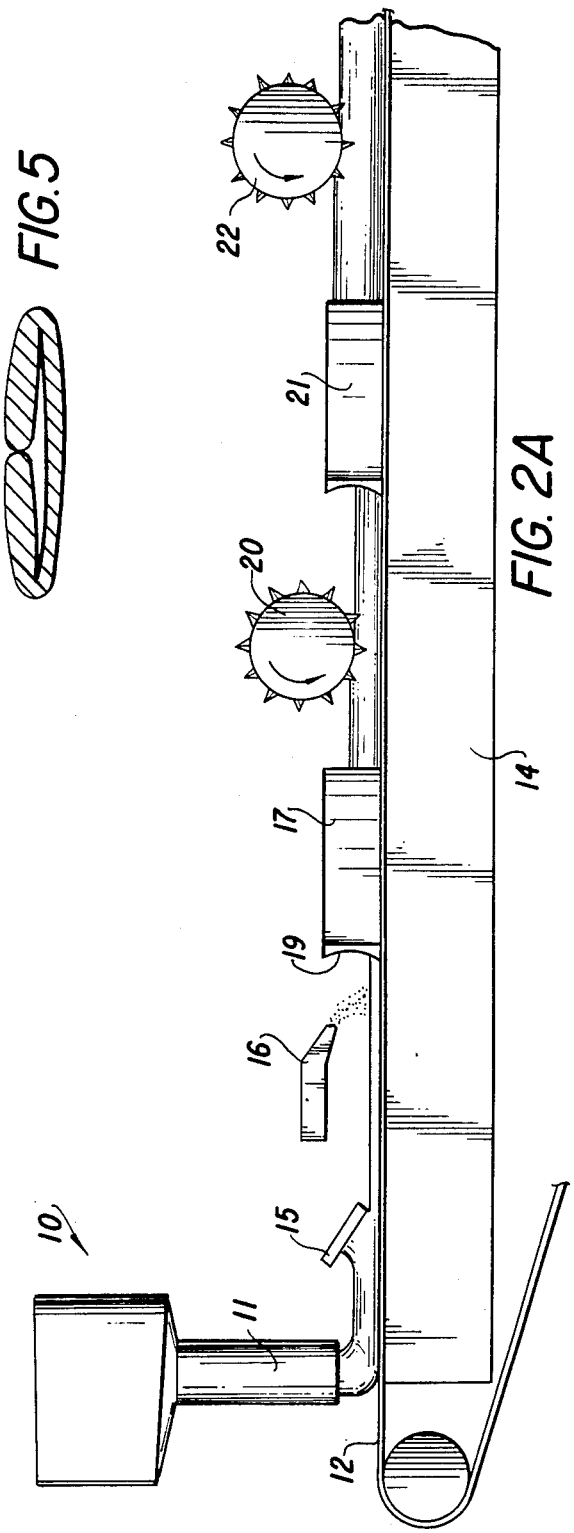

A pair of plow blocks 17 (which are suspended from an overhead framework not shown) engage the edges of the candy sheet and fold the edges over onto the center as shown in cross section in FIG. 5. The plow blocks 17 may be rectangular blocks of plastic or metal which are formed with a concave surface 19 for engaging and folding over the candy sheet.

The folded sheet exiting from the first set of plow blocks 17 is rolled down and stretched by a cleated roller 20. The sheet exiting from the roller 20 is again folded by a pair of plow blocks 21 and then rolled and stretched by a second cleated roller 22. The narrow thick sheet or rope of candy leaving the roller 22 is then turned over twice, as shown in FIGS. 1B and 2B, by single plows 24 and 25 spaced further along the conveyor 12.

The folding and turning of the candy sheet by the plow blocks 17, 21, 24 and 25 allows the candy to cool evenly and prevents excessive cooling of one surface which would result in hardening or "skinning over" of the surface.

Referring now to FIGS. 1C and 2C, at the end of conveyor 12, the rope of candy is transferred onto an oscillating chute 26, and from that chute onto a second conveyor 27 which is traveling at a slower rate than the conveyor 12. The chute 26 oscillates about a vertical axis centrally placed at the input end of the chute. The chute 26 narrows toward its output end and is provided with side walls 29 to direct the flow of the candy rope. The chute 26 is mounted on a vertical shaft 30 which is oscillated about its axis by a motor 31 through a crank 32 on the shaft of the motor, an arm 34 on the shaft 30 and a link 35 interconnecting the crank 32 and the arm 34.

The oscillating motion of the chute 26 causes the candy rope to be laid down in a sinuous pattern on the slower moving conveyor 27. A pair of guide plates 36 (supported by an overhead framework not shown) confine the folds of the candy rope allowing them to build up in front of a smooth sheeting roll 37. The sheeting roll 37, operating against a backing roll 39 beneath the conveyor belt, rolls the accumulated candy mass into a thin candy sheet. This sheet is operated upon by a scoring roll 40 which is formed with two sets of helical ridges (a lefthand set and a right hand set) extending outwardly from the center of the roll. The roll 40 turns at the same speed that the candy sheet is moving and impresses into the candy sheet a "herring-bone" pattern comprising a series of "V" shaped grooves 41 pointing in the direction the sheet is traveling, as shown in FIG. 1C.

Immediately after the roll 40, hot liquefied peanut butter, for example, may be dispensed onto the candy sheet. The peanut butter is pumped from a unit 42 to a pipe 44 that extends across the conveyor 27 and is provided with a number of dispensing nozzles spaced across the candy sheet. The peanut butter is spread with a spreader 45 across the candy sheet and into the grooves 41, as shown in cross section in FIG. 6. The sheet is then rolled from each edge toward the center of the sheet by a pair of sidewinder units 46, each of which contain a serrated roller 47. The units 46 are positioned at each side of the conveyor 27 and the rollers 47 extend over the conveyor at an inward angle from the direction of conveyor travel.

The rollers 47 engage and lift the edges of the candy sheet and roll them toward the center to form a double jelly roll configuration as is shown in cross section in FIG. 7. The grooves 41, because of their orientation, aid in the rolling process. They also act as receptacles to hold the peanut butter within the double roll configuration and thus prevent the peanut butter from squeezing out as the roll is formed.

The double rolled sheet is rolled down by a cleated roller 49 to form a laminated thick sheet as shown in cross section in FIG. 8. This sheet is folded in half by a plow block 50 to form a laminated rope as shown in cross section in FIG. 9. This rope is rolled out into a relatively thick laminate by a cleated roller 51 as shown in FIGS. 1D and 2D. The thick sheet moves from the end of the conveyor 27 through a swing laminator 52 onto a conveyor 54. The laminator 52 includes a substantially vertical plate 55 positioned under the outlet end of the conveyor 27. The plate 55 is pivoted at its upper end about a horizontal shaft 56 and is oscillated by means not shown, to move in an arc as shown by the arrows and thereby repeatedly fold the candy sheet back on itself, placing one layer of laminate upon another. The number of these layers in the sheet produced by the laminator 52 is controlled by the rate of oscillation of the plate 55 and the speed of the conveyor 54 relative to that of the conveyor 27. However, typically three layers of laminate are combined in this manner so that the number of layers of peanut butter and candy are tripled. A pair of side wall guide plates 57 are provided to keep the layers in alignment, one with another.

The laminated sheet is rolled down in three successive stages by cleated rollers 59, 60 and 61. The rolled out thin sheet is transferred to a conveyor 62 and is rolled out further by a sheeting roll 64. This thin sheet is then rolled inwardly from both edges by a second pair of sidewinders 65 to produce another double jelly roll configuration and once again multiply the number of layers of peanut butter and candy in the final product. Each time the number of layers are increased and the sheet is rolled out again, the individual layers become thinner, giving the product a more delicate nature.

Figure 1E:
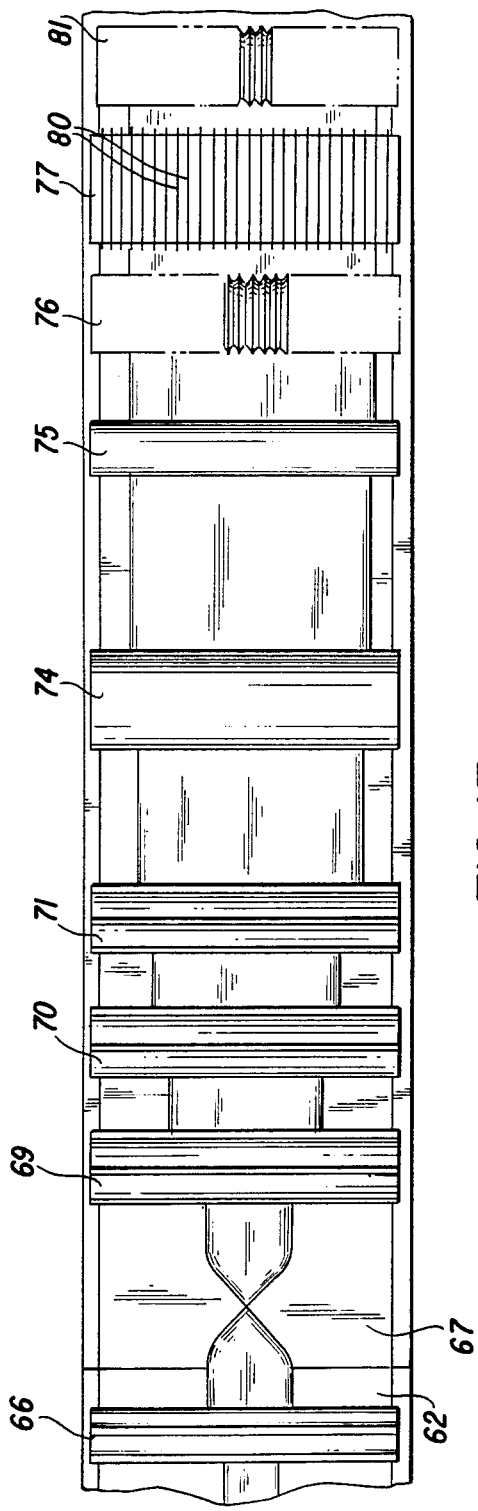
Figure 2E:
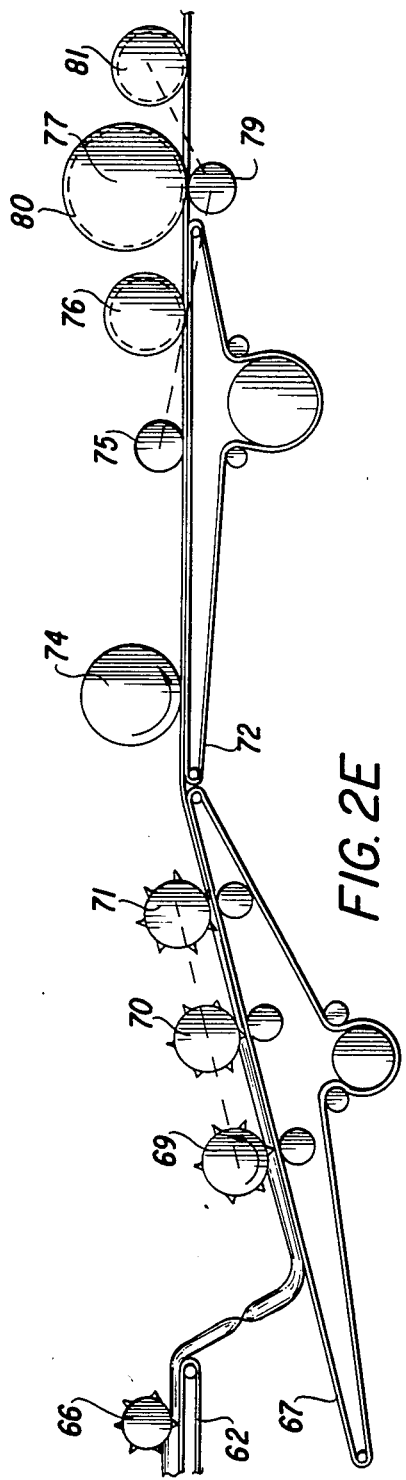

At the end of the conveyor 62, as shown in FIGS. 1E and 2E, the double rolled sheet is rolled down by a cleated roller 66 and the rolled down sheet is twisted 180 degrees and fed onto a conveyor 67 disposed beneath the conveyor 62. This twisting action can be accomplished by plow blocks, for example, similar to the plow blocks 24 and 25 shown in FIGS. 1B and 2B. The sheet is then rolled out in three successive stages by cleated rollers 69, 70 and 71. The reason for twisting the sheet is that at least part of the bottom surface of the candy may have been continuously against the conveyor and may not have been directly subjected to the stretching and working action of the cleated rollers. Therefore the bottom candy layer of the laminate is thicker and denser than the other layers are at the point of the 180 degree twist. The rollers 69, 70 and 71 stretch and thin this layer to make the laminate more uniform throughout its cross section.

The laminate is then transferred to a conveyor 72 and is rolled to its final thickness by sheeting rolls 74 and 75. The sheet is longitudinally grooved by a pre-form roller 76 to facilitate cutting. The preformed sheet moves off the conveyor 72 and between a slitter roll 77 and a back up roll 79. The preformed sheet is longitudinally cut by the slitter roll 77 which has a plurality of thin cutting blades 80. To insure complete severing of the sheet, the back up roll 79 may be provided with slits to receive the tips of the cutting blades. The separated product strips are given their final cross-sectional shape by a shaping roll 81. The product strips may then be cut into product sized lengths and enrobed or encapsulated with chocolate.

Referring now to FIGS. 3A–3E and 4A–4E, there is shown another embodiment of apparatus according to the present invention which includes the same cooking and aerating unit 10, steel band conveyor 12, water cooling unit 14, spreader 15 and vibratory rework feeder 16.

In this embodiment, the peanut butter is preferably deposited on the candy sheet immediately after the rework is added by application pipe 82. The pipe 82 extends from a pressurized source of peanut butter across the conveyor 12. The pipe 82 is provided with a nozzle 84 positioned a short distance from one edge of the candy sheet, and a nozzle 85 positioned further toward the center of the sheet. The two nozzles deposit parallel spaced streams of peanut butter 86, 87 upon the sheet.

A plow block 89 lifts the edge of the candy sheet and rolls it over the first peanut butter stream 86 as shown in cross section in FIG. 10. A second plow block 90 or an extension of the first lifts the enrobed stream 86 and rolls it over the second peanut butter stream 87 as shown in cross section in FIG. 11. A third plow block 91 on the opposite side of the conveyor lifts the other edge of the sheet and folds it over upon the two enrobed streams as shown in FIG. 12.

Figure 3B:
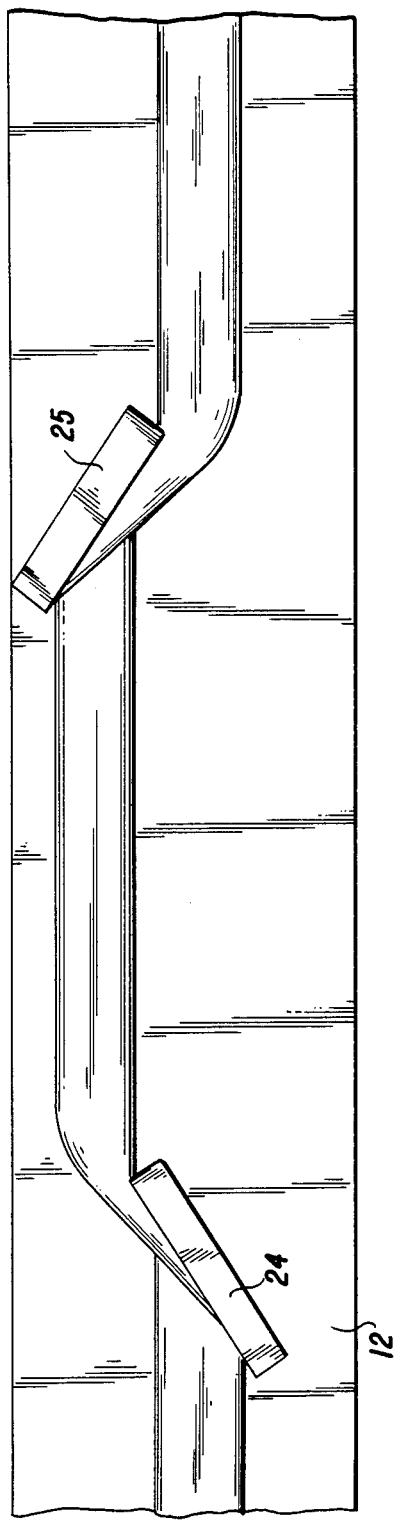
Figure 4B:
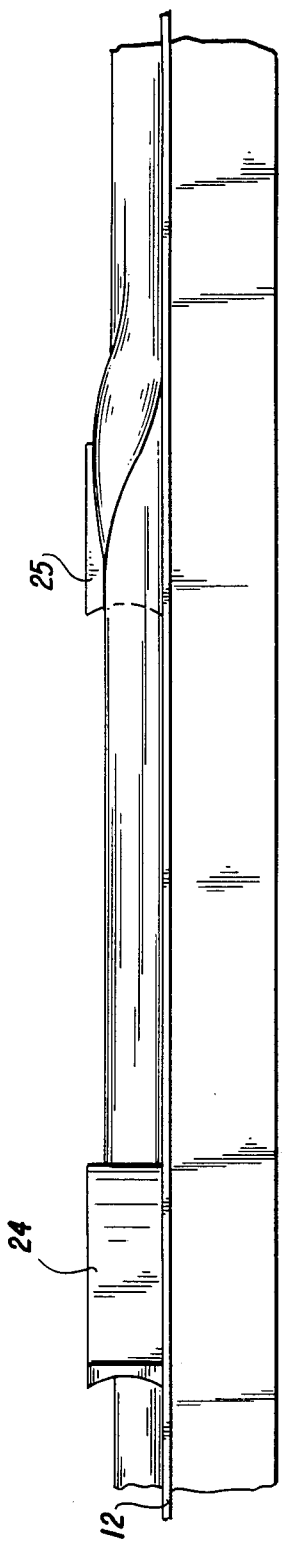

The folded sheet is rolled down by a cleated roll 92 to seal the top two candy layers together and thereby encapsulate the peanut butter within a candy coating. The sealed rope of candy and peanut butter is turned over twice as shown in FIGS. 3B and 4B by single plows 24 and 25 spaced along the conveyor 12. The folding and turning of the candy allows the candy to cool evenly and prevents excessive cooling of one surface which would result in hardening or "skinning over" of the surface.

After being rolled down and turned over twice, the product rope consists of two layers of peanut butter separated and surrounded by candy as shown in cross section in FIG. 13. In this embodiment the product rope is transferred from the conveyor 12 to the conveyor 27 by a laterally pivoting conveyor 94.

The conveyor 94 is supported at its input end by a yoke 95 having a shaft 96 that is journalled in a block 97 which is supported by suitable framework 99. The output end of the conveyor 94 is supported by a wheel 100 oriented transversely of the conveyor and riding on a track 101 which is suitably supported. The output end of the conveyor is oscillated transversly by a motor 102, a crank 104 mounted on the motor shaft, an arm 105 secured to the conveyor 94, and a link 106 connecting the crank 104 to the arm 105.

The transverse oscillation of the conveyor 94 causes the layered rope to be laid down in a sinuous pattern on the slower moving conveyor 27 between the guide plates 36. The folds of the layered rope pile up against the smooth sheeting roll 37 and these folds are pressed together between the sheeting roll 37 and a back up roll 39 to produce a candy sheet having 2 to 4 times as many layers as the layered rope.

The laminated sheet then flows directly to the two sidewinder units 46 where the sheet is rolled from each edge toward the center to produce the double jelly roll configuration and again multiply the number of laminations in the final product. Radiant heaters 47 may be employed as shown to insure that the sheet is sufficiently pliable.

Referring now to FIGS. 3D and 4D, the double rolled sheet is rolled down by a cleated roll 49 and is folded over from each edge by plow blocks 107 and 109 to an on-edge configuration shown in cross section in FIG. 14. A third plow block 110 lays the folded sheet on its side and the sheet now has double the number of laminations as the sheet rolled out by the cleated roll 49.

The sheet is then fed to another cleated roller 51. The wider rolled out sheet exiting from roller 51 flows into the laminator 52 where it is folded back on itself in a number of layers to further multiply the laminae in the product sheet, as explained above with respect to FIGS. 1D and 2D.

In this embodiment, on-edge belt conveyors 111 and 112 are used as guides to keep the layers in alignment with one another. The laminated sheet is then rolled down in stages by the cleated rollers 59, 60 and 61, and is then transferred onto conveyor 72 where it is rolled out by a sheeting roll 114. A pair of side guides 115 extend from the roller 61 to the roll 114 to control the width of the sheet supplied to the roll 114. The roll 114 is provided with a pair of ridges 116 to insure that the sheet exiting from the roll 114 is of uniform width. The conveyor 72 is driven at a somewhat faster rate than the roller 61 to stretch out and thin the laminated candy sheet.

Figure 3E:
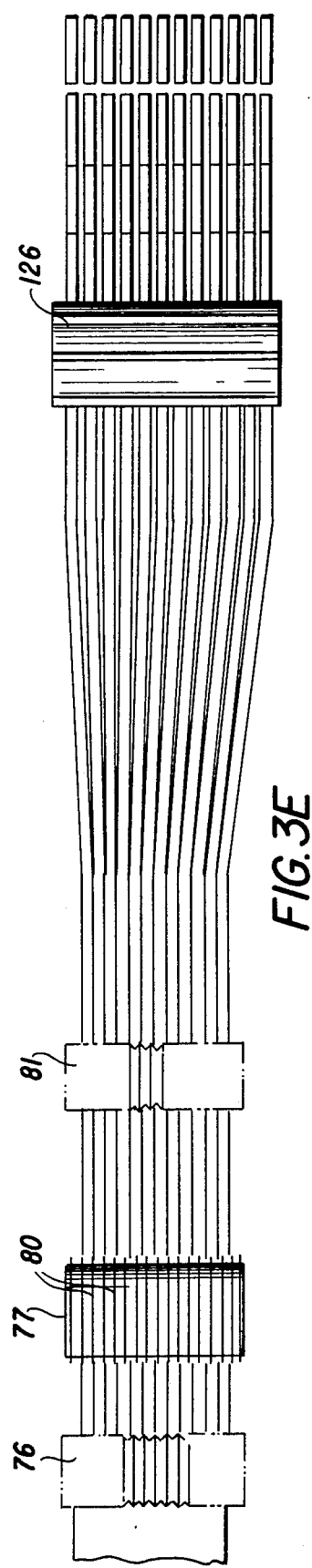
Figure 4E:
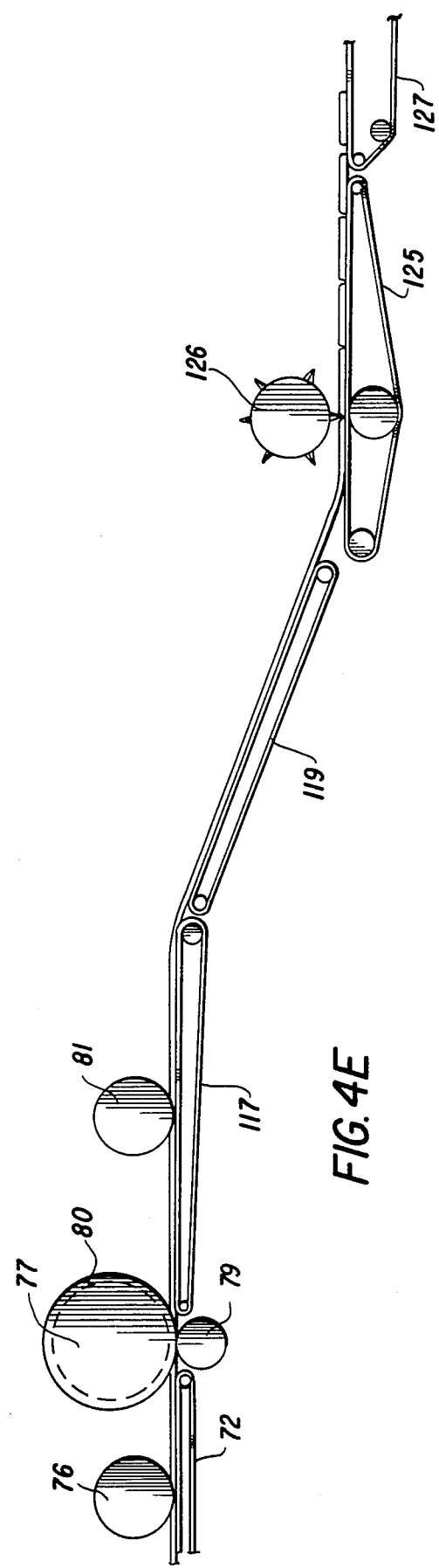

At the end of the conveyor 72, as shown in FIGS. 3E and 4E, the laminated candy sheet moves under the preform roller 76 and between the slitter roll 77 having blades 80 and the slitted back up roll 79. The product strips exiting the slitter roll 77 are carried by a conveyor 117 under the shaping roll 81 and then transferred to a diverging conveyor 119 which may include, for example, a plurality of angled guide or guides of increasing width. The product strips leaving the diverging conveyor 119 are laterally spaced from each other and are transferred to a conveyor 125 where they are cut into product size lengths by a cutter, for example, a rotary cutter 126. The product pieces are spaced longitudinally by transferring them to a faster moving conveyor 127 for chocolate encapsulation.

In FIGS. 16 and 17 there is disclosed an arrangement which could be used in place of the oscillating chute 26 of the first embodiment, shown in FIGS. 1C and 2C, or in place of the pivoted conveyor 94 of the second embodiment, shown in FIGS. 3C and 4C. In the arrangement of FIGS. 16 and 17, diverging vertical guide walls 129 are provided prior to the sheeting roll 37 and the speed of the conveyor 27 is adjusted with respect to that of conveyor 12 to create a piling up of candy mass in front of the sheeting roll 37, much as shown in FIGS. 1C and 3C.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. Apparatus for producing a laminated sheet product having thin layers of a semifluid first material interleaved with thin layers of a semifluid second material, comprising:
   longitudinally extending first conveyor means;
   longitudinally extending second conveyor means, aligned with said first conveyor means and moving at a velocity slower than same;
   means for continuously forming a first sheet of the first material on said first conveyor means;
   means for folding said sheet from an edge thereof over itself to form a rope having a width substantially less than the width of said sheet;
   means for transferring said rope from said first conveyor means to said second conveyor means in alternate first and second directions substantially transverse to said second conveyor means;
   means for continuously forming a second sheet of the first material on said second conveyor means;
   means for continuously depositing the second material on said second sheet to form a layered sheet of said first and second materials;
   means for continuously rolling said layered sheet from the edges thereof inwardly to form a double roll extending longitudinally along said second conveyor means; and
   means for flattening said roll into a laminated sheet product.

2. The apparatus recited in claim 1, further comprising means for transversely guiding the in said alternate first and second directions.

3. The apparatus recited in claim 2 wherein said means for transversely guiding comprises inclined ramp means having vertically extending side walls defining a mouth and an exit port of substantially smaller width than said mouth, oscillating means and means coupling said oscillating means to said inclined ramp means to cause said ramp means to move in said alternate first and second directions.

4. The apparatus recited in claim 3, further comprising means for flattening said rope.

5. The apparatus recited in claim 4 wherein said first material is a candy and said second material is a paste of oil bearing vegetable material.

6. The apparatus recited in claim 2, wherein said means for transversely guiding comprises descending conveyor means, oscillating means and means coupling said oscillating means to said descending conveyor means to cause said descending conveyor means to move in said alternate first and second directions.

7. The apparatus recited in claim 1, wherein said means for depositing comprises means for forming a plurality of grooves in said sheet of said first material angularly across at least part of said sheet and means for spreading said second material into said grooves.

8. The apparatus recited in claim 7 wherein said means for forming a plurality of grooves comprises means for forming a first group of angularly extending grooves from a first edge of said sheet and means for forming a second group of angularly extending grooves from a second edge of said sheet to form a herring-bone pattern.

9. The apparatus recited in claim 8 wherein said means for forming a plurality of grooves comprises grooved roller means.

10. Apparatus for producing a laminated sheet product having thin layers of a semifluid first material interleaved with thin layers of a semifluid second material, comprising:
    longitudinally extending first conveyor means having a first surface;
    longitudinally extending second conveyor means, aligned with said first conveyor means, having a surface positioned lower than said first surface and moving at a velocity slower than same;
    means for continuously forming a sheet of the first material on said first conveyor means;
    means for transferring said sheet from said first surface to said second surface, whereby said second sheet alternately folds over at least a part of itself in first and second longitudinal directions
    means for continuously depositing the second material on said sheet to form a layered sheet of said first and second materials;
    means for continuously rolling said layered sheet from the edges thereof inwardly to form a double roll extending longitudinally along said second conveyor means; and
    means for flattening said roll into a laminated sheet product.

11. The apparatus recited in claim 10, further comprising means for guiding said sheet when said sheet descends from said first surface to said second surface in alternate first and second longitudinal directions.

12. The apparatus recited in claim 11, further comprising means for guiding said sheet on said second lower surface in a direction parallel to the longitudinal direction of said sheet.

13. The apparatus recited in claim 12 wherein said means for guiding said sheet in a direction parallel to the longitudinal direction of said sheet comprises vertically extending wall means.

14. The apparatus recited in claim 12 wherein said means for guiding said sheet in a direction parallel to the longitudinal direction of said sheet comprises belt conveyor means disposed above said conveyor means so that belt surfaces of said belt conveyor means are disposed on either side of said sheet, the surfaces of said belt conveyor means being adapted to contact the sides of said sheet.

15. The apparatus recited in claim 11 wherein said means for guiding comprises substantially vertically disposed pivoting plate means, said plate means being adapted to move in said first and second alternate longitudinal directions and to engage said sheet when siad sheet descends from said first surface to said second surface, whereby said sheet means is caused to alternately fold over at least a part of itself.

16. The apparatus recited in claim 11, further comprising additional means for continuously rolling said sheet from the edges thereof to form a second double roll extending longitudinally along said conveyor means and means for flattening said second double roll.

17. The apparatus recited in claim 10, further comprising means for dividing said laminated sheet product into longitudinally extending strips.

18. The apparatus recited in claim 17 wherein said means for dividing said laminated sheet product into longitudinally extending strips comprises means for providing longitudinally extending grooves in said sheet product and means for cutting said sheet product along said longitudinally extending grooves to form said strips.

19. The apparatus recited in claim 18, further comprising means for transversely dividing said strips into product pieces.

20. The apparatus recited in claim 10 wherein said means for continuously rolling said sheet from the edges thereof comprises longitudinally grooved roller means disposed angularly across at least part of said conveyor means.

* * * * *